Dec. 18, 1956     D. M. BARTON ET AL     2,774,666
RECOVERY OF COOKING LIQUOR FROM SPENT SODA PULPING LIQUORS
Filed June 24, 1954
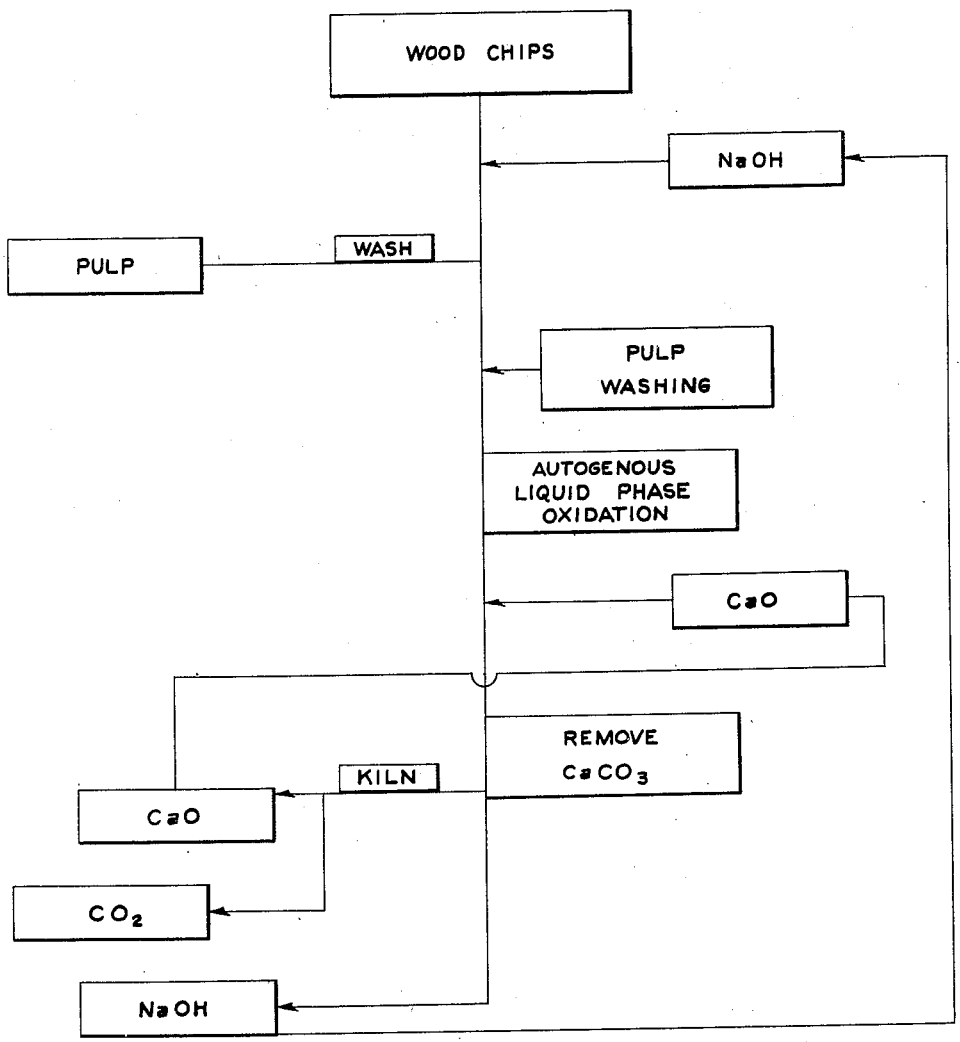
INVENTORS
DANIEL M. BARTON
EUGENE W. SCHOEFFEL
BY
Laurence Vanderkeler & Miller
ATTORNEYS

2,774,666

RECOVERY OF COOKING LIQUOR FROM SPENT SODA PULPING LIQUORS

Daniel M. Barton and Eugene W. Schoeffel, Kronenwetter, Wis., assignors to Sterling Drug Inc., New York, N. Y., a corporation of Delaware Application June 24, 1954, Serial No. 439,067

5 Claims. (Cl. 92—2)

This invention relates to the soda method of producing pulp from wood, and is more particularly concerned with such a process which allows the practical regeneration of the soda, with substantially no loss in washings and stack gases, elimination of the necessity of smelting, the hazards of glowing soda ash, et cetera, and affords a practical method of recovering soda cooking liquor from waste liquors containing the same.

In the pulping of certain types of wood to obtain special types of paper, it has been desired to utilize sodium hydroxide as the pulping material. However, sodium hydroxide has not been generally employed for the digestion of pulping wood, for the reason that it is relatively expensive and in the absence of a suitable recovery procedure, is economically unfeasible for use for general application. The conventional processes for its recovery involves the normal digestion of wood with sodium hydroxide, the separation of the pulp and washings, and combining the washings with the waste liquor. This waste liquor is then evaporated (requiring large amounts of induced and applied heat), burned, smelted, filtered to remove the charcoal, the product being known as green liquor. This green liquor is then caustified with calcium oxide, the calcium carbonate removed by filtration or separation techniques, and this calcium carbonate kilned to provide the calcium oxide for caustification. Of course, the filtrate resulting from the calcium carbonate filtration step is utilized in the digestion. However, approximately thirty percent is required for make-up of the sodium hydroxide employed, because of the large amount which is lost in washings and in stack gases.

It is, therefore, a principal object of the present invention to provide a cyclic process for the pulping of wood utilizing sodium hydroxide as the cooking liquor, which is simple, requires fewer steps than does the prior art procedures, and requires little, if any, make-up material. Additionally, it is an object of the present invention to provide a process for the recovery of sodium hydroxide from spent sodium hydroxide pulping liquors which does not require the large number of filtration steps necessary to the prior art processes, and which affords a waste liquor for discard containing substantially no pollution elements. Another object of the present invention is the elimination of smelting and the hazards of dumping glowing soda ash into water. Still another object of the present invention is the elimination of smelting and burning equipment, with such equipments' attendant maintenance and corrosion problems. A further object of the present invention is the provision of a single calcium carbonate kilning unhampered by undecomposed lignin materials causing filtering difficulties. Another object of the present invention is the elimination of the requirement for outside applied heat, in general, whereby substantial savings in steam may be accomplished, and there is no applied evaporation requirement. Other objects will become apparent hereinafter.

Reference is made to the accompanying drawing which constitutes a flow sheet of the process of the present invention.

Wood chips are treated with sodium hydroxide in a conventional manner, usually in a digester, and this procedure is well known to those skilled in the art. After completion of the digestion with sodium hydroxide, the pulp is separated from the soda waste liquor, the pulp washed with a suitable washing agent, usually water, and the pulp washings combined with the waste soda liquor. Thereafter, this soda waste liquor and the combined pulp washings are passed into an autogenous liquor phase oxidation reactor whereby substantially all of the carbon is converted to carbon dioxide and all of the hydrogen present in the organic material is converted to steam. Since the soda waste liquor is a highly alkaline material, considerable of the carbon dioxide will dissolve in solution, causing the formation of sodium carbonates and bicarbonates. This mixture is then treated with calcium oxide, to cause precipitation of the calcium carbonate. This calcium carbonate is separated and then kilned to form carbon dioxide and calcium oxide. The calcium oxide may be reused to precipitate more effluent liquor from the oxidation procedure, while the carbon dioxide is vented.

Of course, the filtrate, resulting from the filtration procedure above-described is sodium hydroxide and suitable for the digestion of more wood chips. Thus, it will be noted that except for make-up loss, which will run relatively low, less than five percent, and the addition of wood chips, nothing need be added to this cyclic procedure, whereas, pulp and carbon dioxide are the only two materials which emanate from the cyclic procedure. The pulp, of course, is desirable, and the carbon dioxide can be vented to the air without pollution problem. Therefore, the process of the present invention affords not only a simple, economical, and feasible process for the use of soda base liquor as the digestion liquor in pulping, but also eliminates the pollution problem which has been concomitantly present in the use of soda liquors for digestion in prior art techniques. Additionally, the simplicity of the process of the present invention is apparent.

As stated hereinbefore, the process of the present invention contemplates that the wood chips or other fibrous materials will be pulped or digested in the usual manner, utilizing sodium hydroxide as the pulping agent. After completion of the pulping, the pulp is separated from the soda waste liquor in conventional manner, and washed. These washings are added to the soda waste liquor, which is then ready for the oxidation step of the process of the present invention. Any waste liquor or effluent containing substantial amounts of sodium hydroxide, and containing a sufficient quantity of organic material to afford a B. t. u. potential in an amount to cause oxidation in the liquid phase as hereinafter described is a suitable starting material in the oxidation procedure of the present invention.

In substantially completely oxidizing the spent soda pulp liquor, the necessary apparatus comprises a pump for continuously charging the reactor with spent pulp liquor, an air compressor, a tower reactor provided with means to remove periodically any precipitate formed therein, and a flash chamber to receive the oxidized residual spent pulp liquor from the reactor.

In initiating the reactor phase, the spent pulp liquor is pumped into the reactor under pressure of from about 200 to 2000 pounds per square inch, the preferred pressure being that which is sufficient to maintain a desired portion of the waste effluent in the liquid during the oxidation phase. The waste liquor is heated by means of an oil ring to a temperature of between 200 degrees and 372 degrees centigrade, temperatures of from 235 to 300 degrees centigrade being useful for commercially used oxidation. Temperatures in the oxidation zone may be as low as 150 degrees centigrade, but are preferably at least 225 degrees centigrade. Pressures in the oxidation zone are conveniently the autogeneous pressure reaction mixture and are preferably at least 400 pounds per square inch. Compressed air or other compressed gaseous materials capable of furnishing free oxygen under a pressure slightly greater than the pressure in the reaction zone, is introduced into the reactor containing the spent pulp through a dispersion head to initiate the oxidation of the combustible materials. The rate of charging the reactor with spent soda pulp liquor and the rate of introduction of compressed air or other oxidation media is synchronized to ensure the substantially complete oxidation of all the inorganic and organic constituents. Once initiated, the oxidation proceeds exothermically so that no external heat is required, and, in fact, the spent pulp liquor can be introduced into the reactor at a temperature of as low as twenty degrees centigrade, the exothermic heat liberated from the oxidation being sufficient to raise the temperature of the carbonaceous material in the incoming spent liquor to a point where substantially complete oxidation will ensue. The quantity of oxidizing agent supplied is preferably that theoretically required to convert all the organic combustible material to its ultimate end products, namely, carbon dioxide and water, and in general sufficient oxygen to produce substantially complete oxidation of all other oxidizable materials in the spent liquor should be employed in the oxidation reactor.

The oxidized liquor in the reactor is continuously passed through a flash chamber, from which the fixed gases, i. e., nitrogen, undissolved carbon dioxide, and excess air are vented off with steam under pressure.

The liquor effluent from the oxidation reactor contains all the sodium ion equivalent charged into the reactor. Since there is no opportunity for the loss of the sodium material other than by incomplete pulp washings, none should be lost during any step so far in the procedure.

After separation of the liquid effluent from the flash chamber to remove a considerable portion of the carbon dioxide, it is treated with sufficient calcium oxide (which reacts as calcium hydroxide in water) to cause precipitation of most of the bicarbonate and carbonate ion in solution. The separation of the carbonate ion will be accomplished according to the following two reactions:

$$NaHCO_3 + Ca(OH)_2 \rightarrow NaOH + CaCO_3\downarrow + H_2O$$
$$Na_2CO_3 + Ca(OH)_2 \rightarrow 2NaOH + CaCO_3\downarrow$$

Thus, the amount of calcium hydroxide which is employed is an equimolecular quantity compared to that of the carbonate and bicarbonate which is present. This carbonate and bicarbonate determination may be readily made in conventional manner.

Preferably, the oxidized liquor and calcium hydroxide are heated with vigorous agitation at a temperature above about sixty degrees centigrade, and preferably at 85-90 degrees centigrade, in order to ensure complete contact of the reactants, as well as an easily filtratable mixture. This mixture, when so treated, may be readily run through a normal filter press with the precipitate separating readily. The heating time required is approximately twenty minutes, however, periods of an hour at the preferred temperature are most desirable. After filtration, the precipitate can be washed with 85-90 degrees centigrade water to remove the occluded sodium ion and sodium-containing materials. The filtrate and calcium carbonate washings, when combined, will be found to contain substantially all of the sodium introduced into the system, with the loss only through incomplete washings. This sodium is present as sodium hydroxide and is suitable for subsequent digestions. Kilning of the limestone is accomplished by heating at a temperature above about 650 degrees centigrade, and preferably about 900 degrees centigrade, whereby the calcium carbonate is thermally decomposed to carbon dioxide and calcium oxide. Temperatures of 830–905 degrees centigrade are the preferred kilning temperatures.

After the calcium carbonate has been decomposed, the calcium oxide is slurried in sufficient water to cause hydration of substantially all of the calcium oxide, thereby forming calcium hydroxide. This reaction occurs vigorously with the release of heat (approximately 506 B. t. u./lb. CaO). Large quantities of water or some type of cooling method is preferably employed during the hydration of the calcium oxide in water. The carbon dioxide formed by the kilning operation may be vented to the air, and the slurry of calcium hydroxide added to a subsequent effluent from the autogeneous liquid phase oxidation reactor.

It will thus be noted that a process has been provided which gives off only pulp, carbon dioxide, and sodium hydroxide. The amount of heat required for each of the steps of the procedure, with the exception of the kilning, is furnished by the exothermic oxidation reaction. In fact, under proper conditions, only a minimum of the heat possibilities of the soda waste liquor will be lost to radiation and in other unusable ways, and the remaining heat which is present may be satisfactorily used to preheat the oxidation input, as well as to provide extra heat for operating the mill.

Additionally, there is substantially no soda make-up required, since there is no opportunity for loss of the sodium hydroxide, after the system has reached equilibrium. There is no smelting, and the hazards of dumping glowing soda ash in the water, corrosion and maintenance of burning and smelting furnaces, et cetera, are eliminated. The calcium carbonate which is kilned is not hampered by undecomposed lignin materials which produce filtering difficulties for the calcium carbonate.

This procedure is applicable to a continuous cooking procedure, since there is no time element dependent on the operation, burning and smelting, which was necessary to prior art procedures. Additionally, flexibility of scheduling different cooks with different soda concentrations can be accomplished without upsetting the time element for the cooking. Further, since no evaporators are used, there is no fiber clogging in the evaporator. Additionally, many other advantages including those specified hereinbefore accrue through the use of the present process.

The following examples are given to illustrate the procedure of the present invention, but are not to be construed as limiting.

EXAMPLE 1

A soda base cooking liquor obtained after pulping in a conventional procedure was oxidized with air in a pressure-type reactor, whereby temperatures up to 350 degrees centigrade and pressure sufficient to maintain the waste liquor in liquid phase were employed. The following table shows various runs utilizing this procedure:

Table

| | 2-72 | 2-72-1 | 2-72-2 | 2-72-4 | 2-72-6 | 2-72-3 | 2-72-5 | 2-72-7 | 2-72-8 |
|---|---|---|---|---|---|---|---|---|---|
| Na and NaOH g./l. | 56.5 | | | | | | | 53.8 | 54.0 |
| Organic Carbon g./l. | 56.4 | 11.0 | 9.6 | 7.2 | 7.7 | 1.7 | 1.2 | 1.8 | 2.2 |
| $CO_2$ g./l. | 7.2 | | | | | | | 48.8 | 0.4 |
| Chemical $O_2$ Demand g./l. | 133.3 | | | | | | | 1.4 | 1.4 |
| Total $O_2$ Demand g./l. | 151.9 | | | | | | | 6.7 | 7.5 |
| Total Solids g./l. | 163.4 | | | | | | | 77.3 | |
| Ash g./l. | 69.1 | | | | | | | | |
| Volatile Acids as Acetic g./l. | 17.4 | 18.0 | 18.4 | 15.0 | 16.3 | 3.6 | 3.0 | 5.5 | 4.8 |
| Sp. Gr. at 25 degrees C | 1.082 | | | | | | | 1.074 | |
| Ca and CaO g./l. | 0.0 | | | | | | | | |
| Sulfur g./l. | 0.2 | | | | | | | | |
| pH | 12.4 | | | | | | | 8.6 | 12.6+ |
| Reaction Temp., °C | | 250 | 250 | 275 | 275 | 300 | 300 | 300 | |
| Reaction Time in Minutes: | | | | | | | | | |
| (a) Total | | 70 | 160 | 110 | 110 | 120 | 120 | 120 | |
| (b) At reaction temp | | 30 | 120 | 60 | 60 | 60 | 60 | 60 | |
| Percent Carbon Oxidized | | 80.5 | 83.5 | 87.3 | 86.4 | 97.0 | 97.9 | 96.3 | 96.0 |
| Free NaOH g. | | | | | | | | | 49.6 |

Twenty-five hundred and forty (2540) milliliters of the 2-72-7 liquor soda base cooking liquor after pulping and after oxidation, was treated with 265 grams of calcium hydroxide having a purity of 98 percent. The materials were mixed together and heated with stirring to a temperature of 85–90 degrees centigrade for sixty minutes. The reaction mixture was then filtered and the precipitate washed with 85 degrees centigrade water until the total volume of the washings and filtrate was approximately 2500 milliliters. The combined filtrates and washings were cooled to room temperature. The liquid volume was then 2470 milliliters. The filtrate contained 92 percent free sodium hydroxide based on the amount of sodium hydroxide equivalent contained in the original 2-72-7 liquor which was provided prior to oxidation. As this liquor was reused, there would be a higher recovery of the soda, and little or no make-up would be eventually required.

Various modifications may be made in the method of the present invention without departing from the spirit or scope thereof, and it is to be understood that we limit ourselves only as defined in the appended claims.

We claim:

1. A process for the recovery of soda base cooking liquor which comprises: digesting wood chips with soda base cooking liquor; separating a waste soda liquor and oxidizing, in the liquid phase, this liquor at a temperature of between 150 and 372 degrees centigrade and at least 400 pounds per square inch pressure with at least sufficient oxygen to convert all the carbon to carbon dioxide and all the hydrogen to steam; treating the liquid effluent containing sodium carbonate and bicarbonate with sufficient alkaline earth hydroxide to cause precipitation of substantially all of the carbonates and bicarbonates; separating the precipitated alkaline earth carbonates; and, recycling the filtrate containing sodium hydroxide to treat subsequent batches of wood chips.

2. A cyclic process for the digestion of wood chips using a soda base cooking liquor which comprises: digesting wood chips with soda base cooking liquor; separating a waste soda liquor and oxidizing, in the liquid phase, this liquor at a temperature of between 150 and 372 degrees centigrade and at least 400 pounds per square inch pressure with at least sufficient oxygen to convert all the carbon to carbon dioxide and all the hydrogen to steam; treating the liquid effluent containing sodium carbonate and bicarbonate with sufficient alkaline earth hydroxide to cause precipitation of substantially all of the carbonates and bicarbonates; separating the precipitated alkaline earth carbonates and kilning to prepare alkaline earth oxides; and recycling the filtrate containing sodium hydroxide to treat subsequent batches of wood chips.

3. A process for the recovery of soda base cooking liquor which comprises: digesting wood chips with soda base cooking liquor; separating a waste soda liquor and oxidizing, in the liquid phase, this liquor at a temperature of between 200 and 372 degrees centigrade and under the autogenous pressure of the mixture with sufficient oxygen to convert all of the carbon to carbon dioxide and all the hydrogen to steam; treating with agitation and at a temperature of about 85 degrees centigrade the liquid effluent containing sodium carbonate and bicarbonate with sufficient alkaline earth hydroxide to cause precipitation of substantially all of the carbonates and bicarbonates; filtering the precipitate; heating the precipitate to a temperature above about 650 degrees centigrade; and recycling the filtrate containing sodium hydroxide to treat subsequent batches of wood chips.

4. A process for the recovery of soda base cooking liquor which comprises: digesting wood chips with soda base cooking liquor; separating a waste soda liquor and oxidizing, in the liquid phase, this liquor at a temperature of between 200 and 372 degrees centigrade and under the autogenous pressure of the mixture with sufficient oxygen to convert all of the carbon to carbon dioxide and all the hydrogen to steam; treating with agitation and at a temperature of about 85 degrees centigrade the liquid effluent containing sodium carbonate and bicarbonate with sufficient alkaline earth hydroxide to cause precipitation of substantially all of the carbonates and bicarbonates; filtering the precipitate; heating the precipitate to a temperature above about 650 degrees centigrade; venting the carbon dioxide; using the oxides produced by the precipitate heating to treat subsequent oxidized liquor; and recycling the filtrate containing sodium hydroxide to treat subsequent batches of wood chips.

5. A process for the recovery of soda base cooking liquor which comprises: digesting the wood chips with soda base cooking liquor; separating a waste soda liquor and oxidizing, in the liquid phase, this liquor at a temperature of between 225 and 372 degrees centigrade and under the autogenous pressure of the mixture with sufficient oxygen to convert all of the carbon to carbon dioxide and all the hydrogen to steam; treating with agitation and at a temperature of about 85 degrees centigrade the liquid effluent containing sodium carbonate and bicarbonate with sufficient alkaline earth hydroxide to cause precipitation of substantially all of the carbonates and bicarbonates; filtering the precipitate; heating the precipitate to a temperature between about 830–905 degrees centigrade; and, recycling the filtrate containing sodium hydroxide to treat subsequent batches of wood chips.

References Cited in the file of this patent

UNITED STATES PATENTS

| | | |
|---|---|---|
| Re. 4,203 | Eaton | Dec. 20, 1870 |
| 53,839 | Lehman | Apr. 10, 1866 |
| 1,795,557 | Hagglund | Mar. 10, 1931 |
| 2,429,143 | Tomlinson | Oct. 14, 1947 |

(Other references on following page)

| | UNITED STATES PATENTS | |
|---|---|---|
| 2,516,827 | Marshall et al. | July 25, 1950 |
| 2,686,120 | Marshall et al. | Aug. 10, 1954 |

FOREIGN PATENTS

| 9,541 | Great Britain | of 1912 |
|---|---|---|

OTHER REFERENCES

Pulp and Paper Manufacture, vol. I, pp. 403, 404, pub. by McGraw-Hill, New York (1950). (Copy in Scientific Library.)